Jan. 25, 1944. P. W. NESBIT 2,340,251
EDUCATIONAL APPARATUS
Filed Oct. 13, 1942 5 Sheets-Sheet 5

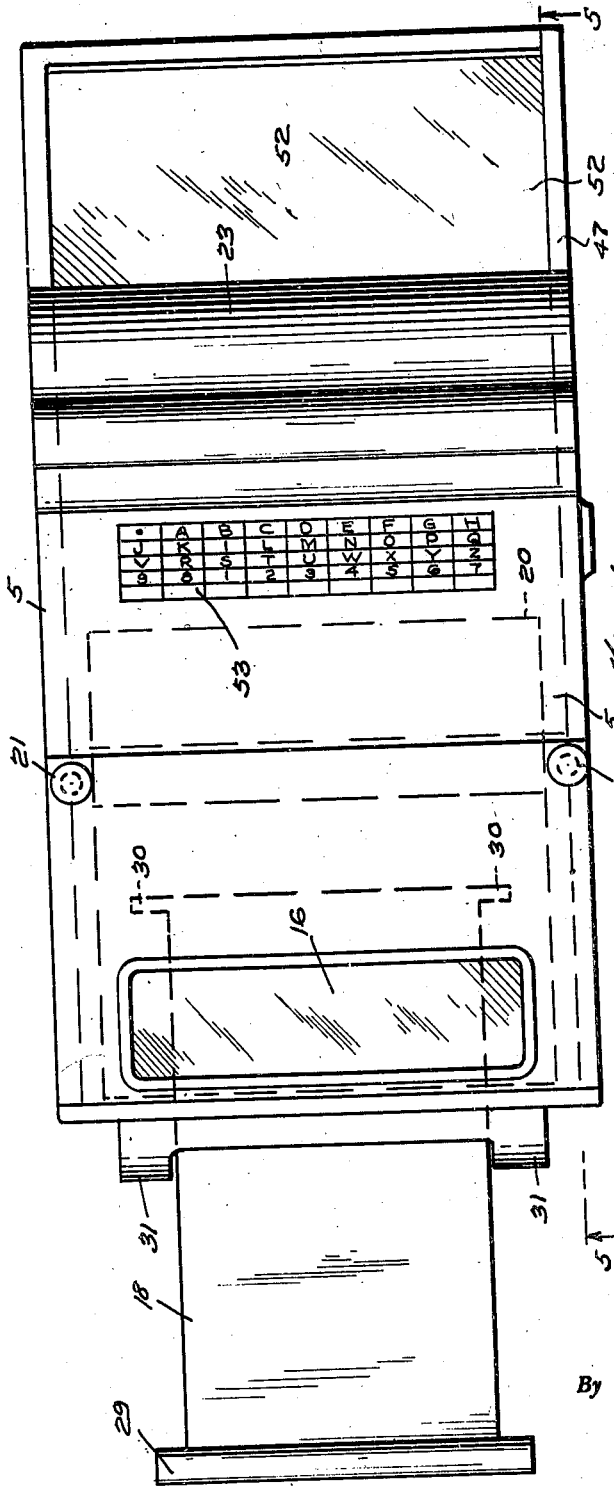

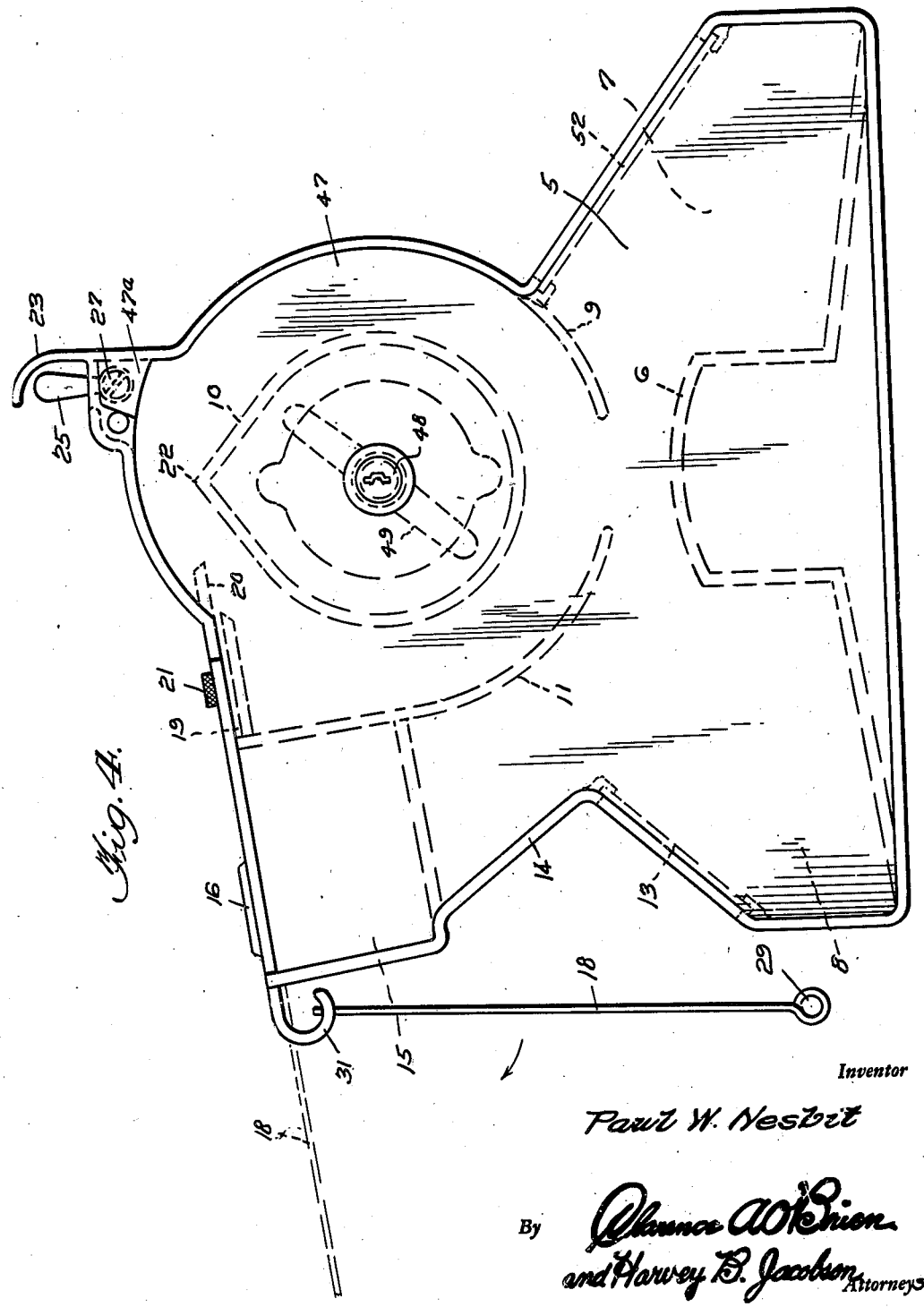

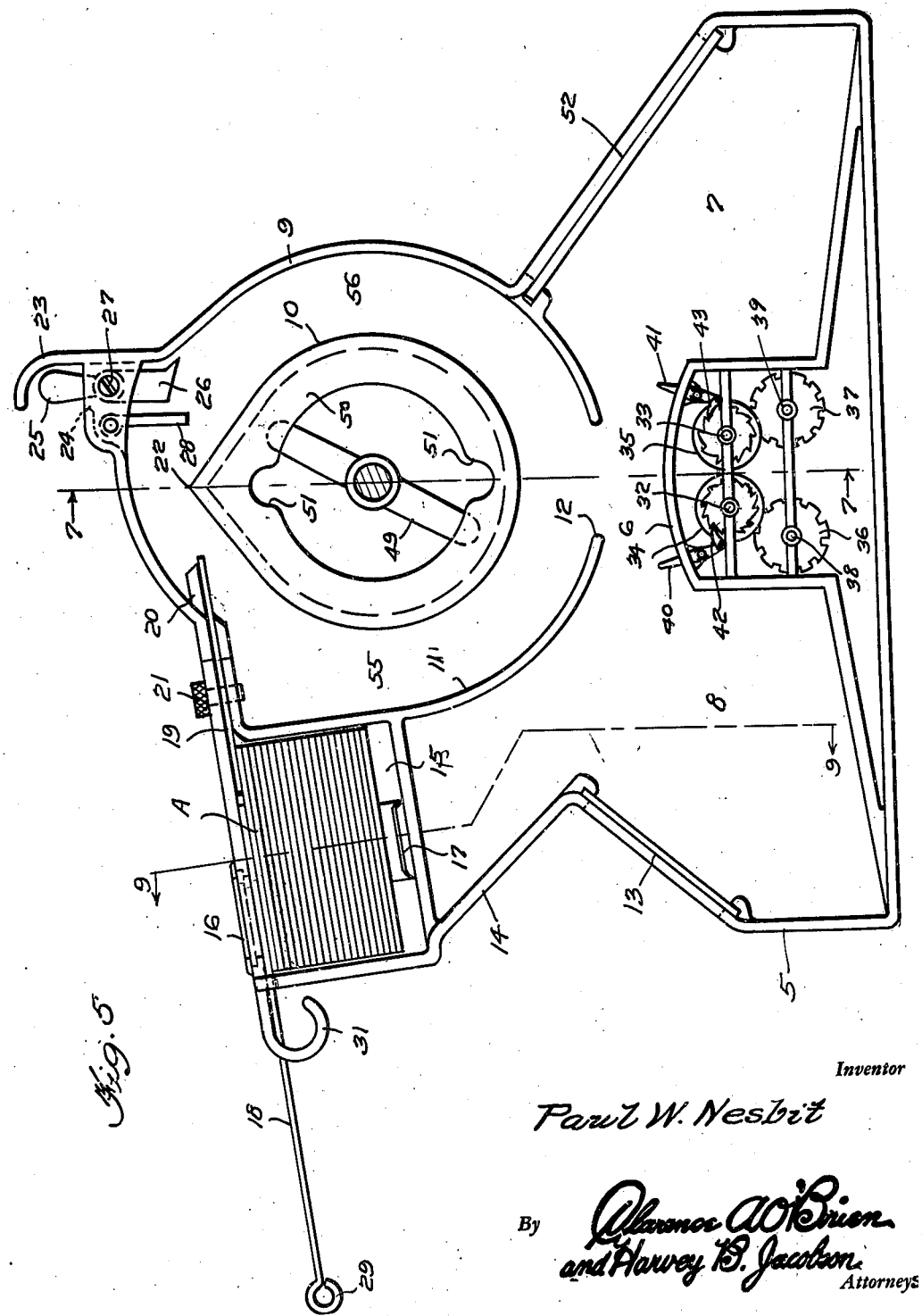

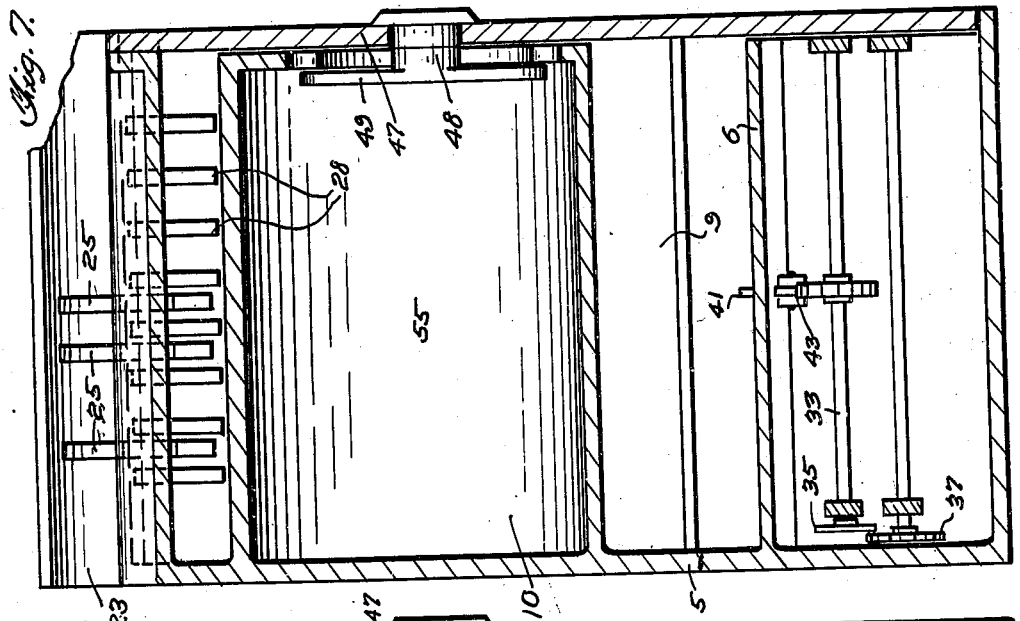
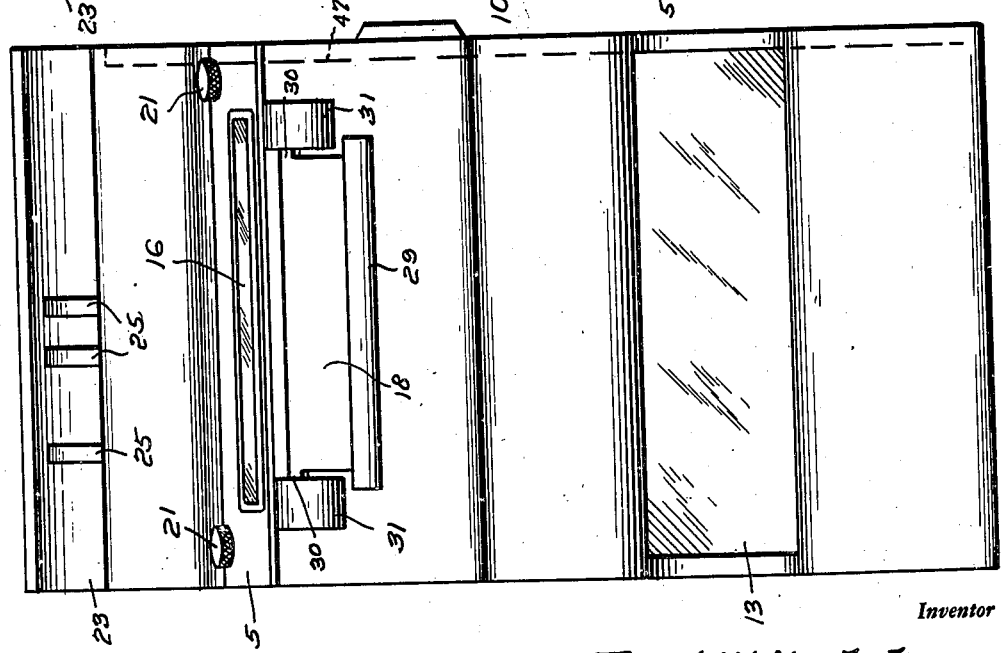

Inventor
Paul W. Nesbit

Patented Jan. 25, 1944

2,340,251

UNITED STATES PATENT OFFICE 2,340,251

EDUCATIONAL APPARATUS

Paul W. Nesbit, Estes Park, Colo.

Application October 13, 1942, Serial No. 461,875

2 Claims. (Cl. 35—48)

This invention relates to new and useful improvements in educational apparatus, and more particularly to a question and answer machine.

The principal object of the present invention is to provide a machine of the character stated which will serve to save teachers and other examiners the work of correcting examination papers.

Another important object of the invention is to provide a machine which will be of considerable value in teaching habits of accuracy and any subject matter of a factual nature.

Another important object of the invention is to provide an educational machine of the character stated wherein the questions can be assorted according to difficulty.

Still another important object of the invention is to provide an educational apparatus of the character stated wherein certain operations take place automatically.

Other important objects and advantages of the invention will become apparent to the reader of the following description.

In the drawings:

Figure 1 represents a top plan view.

Figure 2 is a fragmentary perspective view showing one of the question and answer cards and a portion of the pusher.

Figure 3 is a plan view of the question card shown in Figure 2, same being shown reversed in order to disclose the answer.

Figure 4 is a side elevational view of the machine.

Figure 5 is a side elevational view of the machine with the cover plate removed.

Figure 6 is a front elevational view of the machine.

Figure 7 is a vertical sectional view taken substantially on the line 7—7 of Figure 5.

Figure 8:
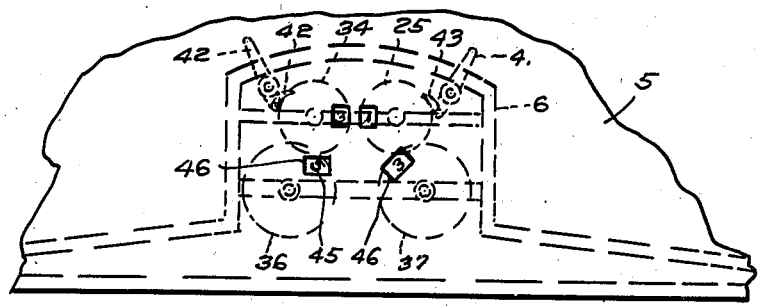
Figure 8 is a fragmentary side elevational view looking at the score keeping registers.
Figure 9:
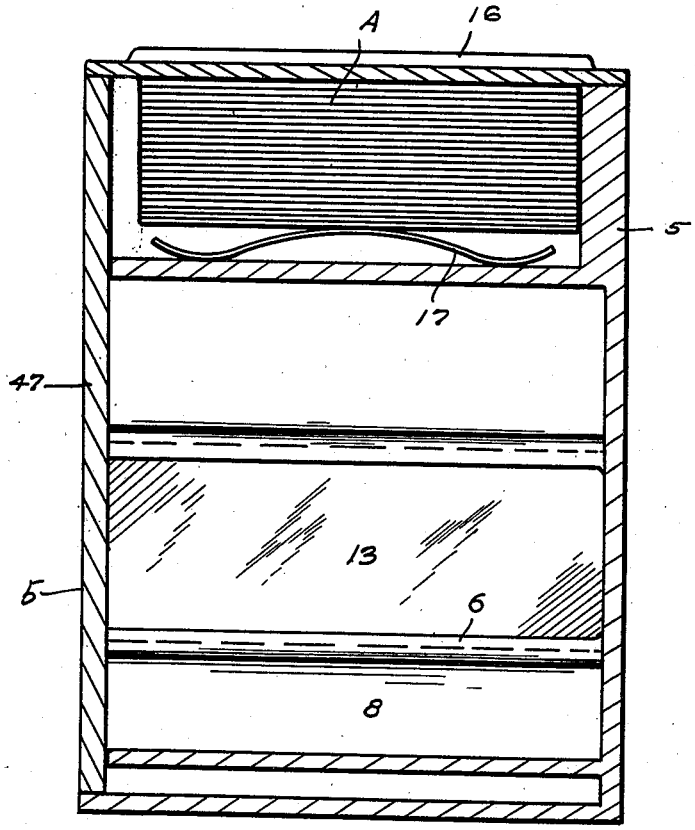
Figure 9 is a vertical sectional view taken substantially on line 9—9 of Figure 5.

Referring to the drawings wherein like numerals designate like parts, it can be seen that numeral 5 denotes a housing, from the intermediate portion of the bottom of which rises a shed-like structure 6 dividing the lower portion of the shell into a correct answer card receiving compartment 7 and an incorrect answer compartment 8.

The upper portion of the shell 5 is provided with a semi-cylindrical portion 9 which is opposed to a substantially cylindrical tube 10. At the opposite side of the tube 10 from the portion 9 is an arcuate guide 11. The lower end of the guide 11 terminates in spaced relation with respect to the lower end of the portion 9, as at 12, to afford an opening through which cards can pass to either of the compartments 7 or 8.

At the front of the machine the shell 5 slopes inwardly where it is provided with a window 13 and then slants upwardly, as at 14, and formed to provide a card receiving compartment 15 over which is a window 16.

Question and answer cards such as are shown in Figures 2 and 3 and denoted by letter A are stacked in the compartment 15 over a spring 17, which of course urges the cards upwardly to a plane coincident with a plate-like pusher 18 and a slot 19. It will be observed that the top of the shell 5 is constructed to accommodate a plate 20 which can be adjusted by a screw 21 to take care of cards of different thicknesses, and also widths, so that the plate 20 can be advanced into the upper portion of the shell, above the tube 10, to the end that it may be adjusted with respect to a raised fulcrum point 22 on said tube 10.

At the top of the shell 5 is a raised and forwardly curved shield 23 and a slot 24 through which the handles 25 of three beveled card guides 26 project.

The card guides are adjustable longitudinally on a notched rod 27, and similarly adjustable swingable comb-like guard members 28 are mounted on a rod 28' in front of the guides 26 for a purpose to be described.

The pusher 18 is provided with a rolled outer end 29 and laterally disposed ears 30 at its inner end. A question, as in Figure 2, is printed on one side of each card A and the answer, as in Figure 3, on the other side, and said cards are stacked with the question side up for reading through the window 16. Obviously, when the pusher 18 is pulled all the way out of the compartment 15, so that another card can be pushed into position by the spring 17, the ears 30 will rest on the downturned hooks 31 and become suspended in the position shown in Figure 4.

In the shed-like structure 6 are shafts 32, 33 on which are wheels 34 and 35 in operative relation with respect to counterwheels 36, 37 located on shafts 38, 39. Swingable arms 40, 41 carrying pawls 42, 43 are operated by falling cards and these in turn ultimately operate the counterwheels 36, 37, the indicating numerals 45 on which, are visible through openings 46 in a side wall of the shell, as shown in Figure 8.

The opposite side wall of the machine is in the form of a removable plate 47, conforming at its edge with the contour of the shell 5, and this plate has a lock 48 which serves to permit rotation of a keeper 49, operative within the tube 10 (see Figure 5) and behind a flange 50, this flange being formed with notches 51, 51 through which the end portions of the keeper 49 can be pulled when the lock 48 has been unlocked and the keeper 49 rotated to the proper position.

As can be seen in Figure 4, the upper portion of the removable plate 47 has a lip 47a which rises against or adjacent to the outer end of the headed end of the rod 27, so that when the removable plate 47 is locked in place, access to the rod 27, which is removable is not possible without detection. Obviously, the rod 27 is removable so that additional card guides may be added depending upon the number of guides needed for a certain set of notched cards.

With respect to the counting mechanism, it is obvious that the counter wheels can be brought together closely so that single windows or observation openings may be afforded for complementary wheels.

At this point it can also be seen that the back of the machine is provided with a window 52 so that the correctly answered cards can be inspected.

It will be seen that the cards A are notched in a certain key manner.

The top of the shell 5 has a key chart 53 showing an arrangement of letters and numerals in columns.

The cards A are each formed with leading edge notches 54 corresponding in spacing to the column spacing in the key chart 53 of the first three letters, or numerals, of the answer to the question on the card. The notches in rod 27 are spaced along the same in correspondence with the column spacing in the key chart 53, and said rod is arranged in the rear of said chart with the notches opposite said columns. The card guides 26 are designed to be selectively set in notches of the rod 27 opposite the columns and the notches 54 in the cards A are of the proper width to straddle said guides. In case two letters, or members, of an answer fall in the same column of the key chart 57, the card is provided with a notch of double width to accept two card guides set side by side. In operating the machine, the operator reads the question on the top card A of the stack through the window 19. He then determines in his mind the answer to the question and sets the card guides 26 opposite the columns in the key chart 53 containing the first three letters, or numbers, of his answer. In the card A shown, two of the first three letters of the answer, to wit, T and L fall in the same column and the setting of two of the card guides side by side opposite said column would be required, in the correct answer, for straddling by a double width notch in the card. The card is next fed forwardly by the pusher 18 out of the slot 19 and over the fulcrum point 22 of the tube 10. If the correct answer has been determined by the operator, the card guides will have been selectively set so that the notches in the card A will straddle the guides as the card leaves the slot 19 and further feed of the card thereby stopped with the card overbalanced on the fulcrum point 22 to fall into a passageway 55 leading to the slot 12 and to subsequently fall from the slot into the correct answer card receiving compartment 7 striking the lever 41 during its fall in the said compartment to thereby cause the counting wheel 35 to count the same.

If the selection of the answer, and setting of the card guides 26, has been incorrect, said card guides 26 will have been set so as to prevent at least one of the notches in the card from straddling the same. In this event the leading edge of the card A will strike the card guides 26 before the card leaves the slot 19, and under further feed of the card said edge will be cammed downwardly beneath said guides by the lower ends of the guides until the card leaves the slot 19 so that it will be overbalanced on the fulcrum point 22 to fall into a passageway 56 leading to the slot 12 and directing said card so that it falls into the incorrect answer compartment 8 striking the lever 40 during its fall and thereby causing the counter wheel 37 to count the card. When the card guides 26 are set, the guard members 28 are set along the shaft 28' to be swung rearwardly alongside the guides 26 by the card and thereby prevent the guides from becoming laterally displaced from their setting and as an incident to the leading edge of a card lifting said guides out of the notches in the rod 27. The guard members 28 being swingable by the cards do not interfere with the feed thereof. It will be observed that the cards in passing down one or the other of the passageways 55, 56, invert themselves so that the answer sides are up when they reach the compartments 7 and 8, and in this position can be viewed through the windows 13 and 52.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In apparatus of the class described, a stack of cards having notches in one edge thereof spaced apart along the same differently in each card, a housing having an upper cylindrical part provided with a bottom slot, a fulcrum member in said cylindrical portion forming therewith a pair of curved passageways upon opposite sides of the fulcrum member for directing cards dropped through said passageways to the slot from opposite sides thereof, whereby cards falling through said passageways will discharge out of said slot in oppositely inclined paths, respectively, to form separate piles, means to feed cards from said stack seriatim over said fulcrum member, notched edge foremost, and means to overbalance the cards on the fulcrum member to cause the same to fall into one of said passageways, said last means comprising card guides settable in the path of feed of the cards to align the same with the notches in the cards and through engagement with said notches limiting feed of the cards, said guides being settable out of alignment with said notches to cam the cards downwardly from said fulcrum member into the other passageway.

2. In apparatus of the class described, a stack of cards having notches in one edge thereof spaced apart along the same differently in each card, a housing having an upper cylindrical part provided with a bottom slot, a fulcrum member in said cylindrical portion forming therewith a pair of curved passageways upon opposite sides of the fulcrum member for directing cards dropped through said passageways to the slot from opposite sides thereof, whereby cards falling through said passageways will discharge out of said slot in oppositely inclined paths, respectively, to form separate piles, means to feed cards from said stack seriatim over said fulcrum member, notched edge foremost, and means to overbalance the cards on the fulcrum member to cause the same to fall into one of said passageways, said last means comprising card guides settable in the path of feed of the cards to align the same with the notches in the cards and through engagement with said notches limiting feed of the cards, said guides being settable out of alignment with said notches to cam the cards downwardly from said fulcrum member into the other passageway, and means operative by the cards discharging from said slot to count the cards discharging in each of said directions separately.

PAUL W. NESBIT.